United States Patent
Genin et al.

(10) Patent No.: US 7,502,868 B2
(45) Date of Patent: Mar. 10, 2009

(54) AUTOMATION EQUIPMENT CONNECTED TO A TCP/IP NETWORK

(75) Inventors: Jean-Jacques Genin, Nice (FR); Thomas Godicke, Valbonne (FR); Francois Gorisse, Mougins (FR)

(73) Assignee: Schneider Automation, Valbonne (FR)

( * ) Notice: Subject to any disclaimer, the term of this patent is extended or adjusted under 35 U.S.C. 154(b) by 709 days.

(21) Appl. No.: 10/227,340

(22) Filed: Aug. 26, 2002

(65) Prior Publication Data

US 2003/0055941 A1  Mar. 20, 2003

(30) Foreign Application Priority Data

Sep. 3, 2001 (FR) .................................. 01 11506

(51) Int. Cl.
*G06F 15/16* (2006.01)
(52) U.S. Cl. .................. 709/250; 709/249; 709/233; 709/218; 709/203; 709/224; 709/225; 709/229
(58) Field of Classification Search ......... 709/249–250, 709/233, 218, 203, 224–225, 229
See application file for complete search history.

(56) References Cited

U.S. PATENT DOCUMENTS

| | | | | | |
|---|---|---|---|---|---|
| 5,307,413 | A | * | 4/1994 | Denzer ........................ 713/151 |
| 5,608,882 | A | * | 3/1997 | Abert et al. .................. 710/307 |
| 6,108,786 | A | * | 8/2000 | Knowlson ..................... 726/11 |
| 6,144,993 | A | * | 11/2000 | Fukunaga et al. ........... 709/208 |
| 6,151,625 | A | | 11/2000 | Swales et al. |
| 6,327,511 | B1 | * | 12/2001 | Naismith et al. .............. 700/19 |
| 6,452,910 | B1 | * | 9/2002 | Vij et al. ...................... 370/310 |
| 6,470,389 | B1 | * | 10/2002 | Chung et al. ................. 709/227 |
| 6,587,884 | B1 | * | 7/2003 | Papadopoulos et al. ..... 709/230 |
| 6,665,293 | B2 | * | 12/2003 | Thornton et al. ............ 370/352 |
| 6,665,304 | B2 | * | 12/2003 | Beck et al. ................... 370/401 |
| 6,697,857 | B1 | * | 2/2004 | Dixon et al. ................. 709/224 |
| 6,701,377 | B2 | * | 3/2004 | Burmann et al. ............ 709/249 |
| 6,760,782 | B1 | * | 7/2004 | Swales ......................... 709/250 |
| 6,782,422 | B1 | * | 8/2004 | Bahl et al. ................... 709/224 |
| 6,847,974 | B2 | * | 1/2005 | Wachtel ....................... 707/101 |
| 6,928,473 | B1 | * | 8/2005 | Sundaram et al. ........... 709/224 |
| 7,032,029 | B1 | * | 4/2006 | Tanzman et al. ............ 709/245 |
| 7,035,898 | B1 | * | 4/2006 | Baker ........................... 709/203 |
| 2001/0003804 | A1 | * | 6/2001 | Papadopoulos et al. ....... 700/83 |
| 2002/0046263 | A1 | * | 4/2002 | Camerini et al. ............ 709/219 |
| 2002/0059485 | A1 | * | 5/2002 | Godicke et al. ............... 710/10 |
| 2002/0144124 | A1 | * | 10/2002 | Remer et al. ................ 713/182 |
| 2004/0114591 | A1 | * | 6/2004 | Naismith et al. ............ 370/389 |

OTHER PUBLICATIONS

U.S. Appl. No. 09/902,748, filed Jul. 12, 2001.
U.S. Appl. No. 10/227,340, filed Aug. 26, 2002, pending.

* cited by examiner

*Primary Examiner*—Alina N. Boutah
(74) *Attorney, Agent, or Firm*—Oblon, Spivak, McClelland, Maier & Neustadt, P.C.

(57) ABSTRACT

An automation equipment includes a system unit and a driver. The system unit has at least one memory including a real time operating unit and an application program unit that performs monitoring or control functions in an automation application. The driver is directly included in the system unit and is configured to connect to a TCP/IP network without going through a back panel bus. The operating unit of the system unit includes a communications management module configured to communicate to the TCP/IP network, and a control task unit responsible for controlling execution of the communications management module, the control task unit being directly connected to the communications management module to avoid disturbing an operation of the application program unit.

16 Claims, 1 Drawing Sheet

AUTOMATION EQUIPMENT CONNECTED TO A TCP/IP NETWORK

BACKGROUND OF THE INVENTION

1. Field of the Invention

This invention relates to automation equipment directly connected to a TCP/IP communication network.

2. Description of the Invention

The IP (Internet Protocol) standard protocol defines a protocol for interconnection of communication networks at the network layer. The TCP (Transport Control Protocol) standard protocol defines a data transport mechanism that guarantees end to end routing. These two protocols that are widely used in Internet, Intranet or Extranet type global networks are grouped under the term "TCP/IP network" in this presentation.

In the following, automation equipment denotes a programmable logic controller, a monitoring/control station, a digital control or any equipment that may contain and execute an application program in order to check and/or control all or some of an automation application, for example belonging to the field of industrial logic controllers, building or monitoring/control logic controllers for electrical distribution networks. Automation equipment may also comprise industry specific modules that are also provided with a processing unit to perform particular functions related to an automation business (such as weighing, regulation, positioning, etc.) and other modules such as input/output modules. Modules of automation equipment are connected together and synchronised with each other through an internal communication bus, usually called a back panel bus, that usually uses a proprietary protocol optimised for real time input/output exchanges.

In automation equipment, it is well known that a communication module can be arranged firstly connected to the internal communication bus of the automation equipment, and secondly to the TCP/IP network. This communication module creates a bridge between firstly the internal communication services and proprietary services, and secondly the TCP/IP network.

However, under these conditions, it is very complex to maintain the characteristics of a communication according to the TCP/IP protocol from end to end between two entities communicating with each other. The gateway for a network module cuts off the TCP data flow and does not make the IP transparent. The result is that the benefits in terms of performance, reliability and transparency provided by the TCP/IP protocol are lost.

Furthermore, a communication system in an automation equipment is known in which information exchanges conform with the TCP/IP protocol are possible on the internal communication back panel bus. The modules of the automation equipment have their own IP address and a TCP/IP stack that can be executed by the processing unit of these modules, in order to exchange information conform with the TCP/IP communication protocol. Furthermore, the automation equipment comprises a network module connected to an external TCP/IP network and to the internal back panel bus, that the automation equipment modules can use to make information exchanges conform with the TCP/IP communication protocol directly on the TCP/IP network, through the internal back panel bus.

Nevertheless, this solution uses the internal back panel bus of the automation equipment to route the TCP/IP communication, which can be harmful for the performances of real time communications related to the automation application, and also requires the use of a dedicated network coupler.

BRIEF SUMMARY OF THE INVENTION

The purpose of the invention is to propose automation equipment with direct access to the TCP/IP protocol for exchanges on a TCP/IP network, without the use of a gateway at the application layer that can be expensive. Due to the TCP/IP protocol, the automation equipment may be directly connected to company information systems (ERP Enterprise Resource Planning, MES Manufacturing Execution System), and may use WEB protocols and architectures, for example such as UDP, HTTP, XML, WAP, FTP, SMTP, SNMP, DHCP, DNS, etc. Furthermore, the invention proposes to manage a TCP/IP communication directly in the system unit of the automation equipment without passing through the back panel bus, while maintaining control of the different assignments of the system unit so that communications through the TCP/IP network do not disturb real time operation of the application program performing the monitoring/control of the automation application. Furthermore, the back panel bus may advantageously be reserved for input/output type exchanges or real time message type exchanges (for example, reflex messages,) from the automation equipment.

In order to achieve this, the invention describes automation equipment comprising a system unit that has at least one memory comprising a real time operating system and an application program that performs monitoring or control functions in an automation application. The automation equipment comprises a TCP/IP network driver that is directly included in the system unit without going through a back panel bus, the operating system of the system unit comprising a management module for communications on the TCP/IP network and a control task responsible for controlling the execution of the communications management module to the characteristics of the automation application to avoid disturbing operation of the application program.

According to one feature, when the application program is executed in a periodic mode, the control task comprises validation means to authorise operation of the communications management module between the end of an application program cycle and the beginning of the next cycle. Furthermore, when the application program is executed in a cyclic mode, the control task comprises validation means to authorise operation of the communications management module at the end of an application program cycle, for a time that a user can configure.

According to another feature, the communications management module comprises a first sub-module that uses a memory area to memorise data transmitted or to be sent to the application program. The communications management module also comprises a second sub-module that uses a memory area to memorise transmitted data or data to be sent to the TCP/IP network.

According to another feature, the first sub-module of the communications management module transmits data from the automation application program to the second sub-module of the communications management module to build up a message transmitted on the TCP/IP network.

According to another feature, the second sub-module of the communications management module transmits information representative of messages from the TCP/IP network to the first sub-module of the communications management module so that it can be used by the application program.

In particular, information representative of messages received from the TCP/IP network include commands to update the application program, and commands to modify application program execution parameters, for which the user himself must check the consistency. Similarly, data from the application program that the first sub-module memorises include in particular automation operating state indication, for which the user himself must check the consistency.

According to another feature, the TCP/IP network driver executes a routing procedure for messages received from the TCP/IP network that is based on priority levels contained in IP addressing.

BRIEF DESCRIPTION OF THE DRAWINGS

The invention and its characteristics and advantages is now described in detail with reference to the attached drawings in which.

DETAILED DESCRIPTION OF THE INVENTION

Figure 1:
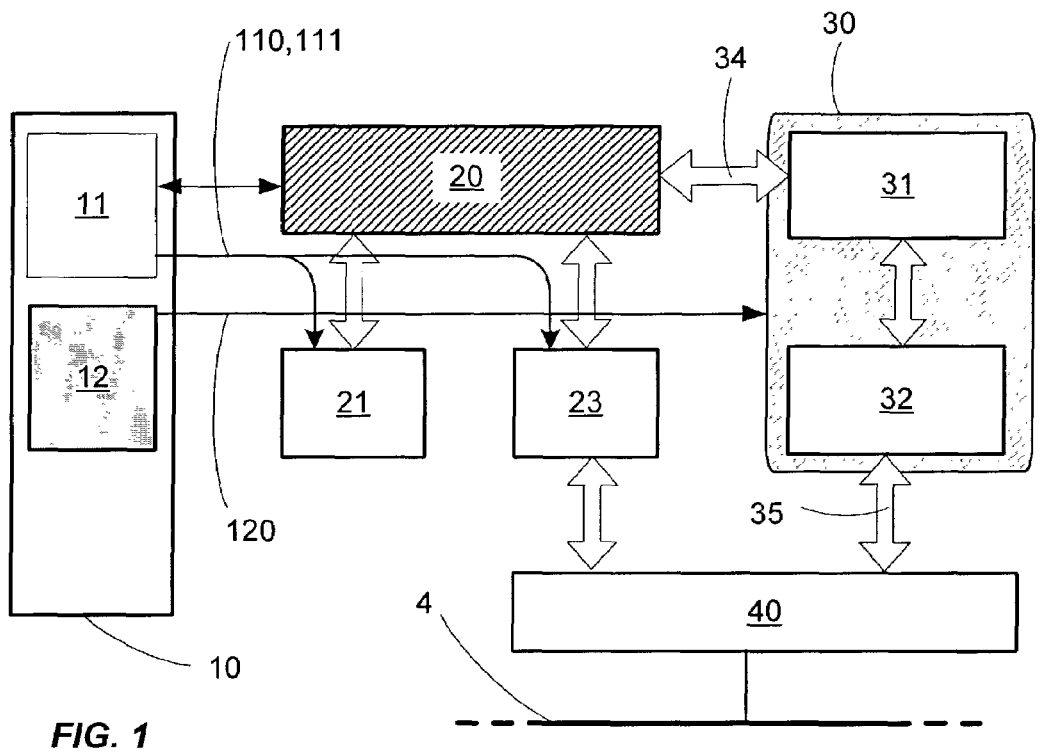
FIG. 1 shows the diagram for the communication architecture of automation equipment according to the principle of the invention.
Figure 2:
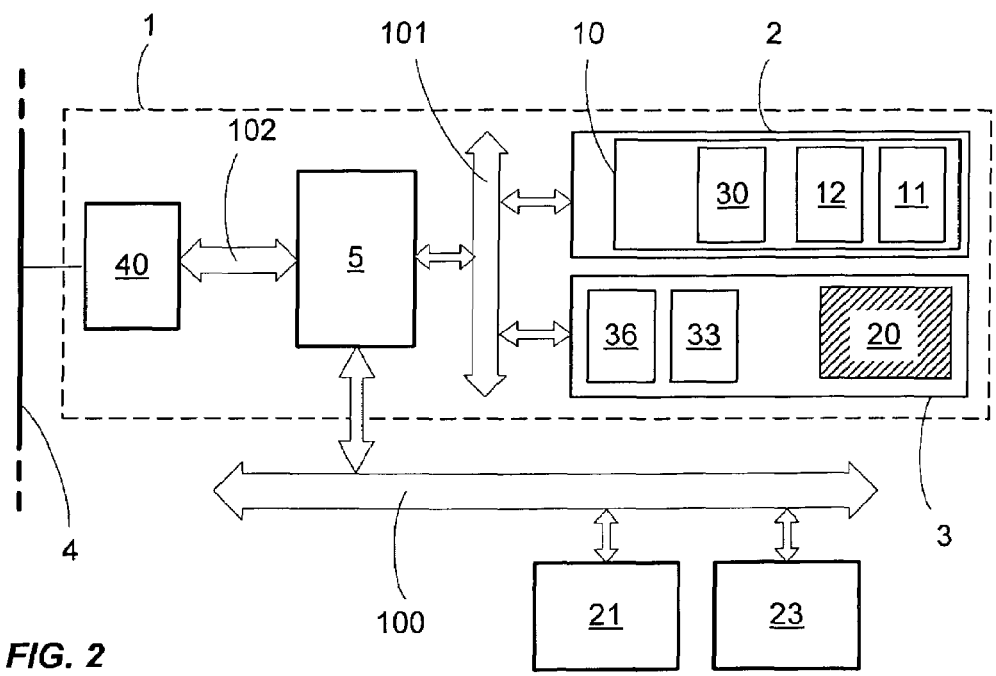
FIG. 2 diagrammatically shows an example architecture of such automation equipment.

The automation equipment according to the invention comprises a network connection controlled by a driver (40) supporting the TCP/IP protocol. The automation equipment comprises a system unit (1) comprising at least one processor (5) and a memory bus (101) for swaps between a RAM (3) and a ROM (2), in a known manner. The automation equipment also comprises an internal communication bus (100) called the back panel bus in this document, an input/output manager (21) and a real time message processing manager (23), these managers being connected to the back panel bus (100) in the automation equipment. The ROM (2) comprises the manufacturer's program (10) or the operating system of the automation equipment responsible for monitoring and controlling execution of an application program (20) or a user program usually stored in the RAM (3) of the automation equipment. Remember that the application program (20) processes input-output data to check and/or control an automation application, and these input-output data are transferred by the input-output manager (21), and manages coupling data for several items of equipment for which the transfer is made through the real time message processing manager (23). According to the invention, the automation equipment comprises a TCP/IP network driver (40) that is directly integrated in the system unit (1) through a specific software bus (102) without using the back panel bus (100), and that can be used to connect the automation equipment to the TCP/IP network (4).

The automation equipment operating system (10) also comprises a scanning manager (11) that will generate signals sent at the beginning of the cycle (111) and at the end of the cycle (110) of the application program (20). These signals are sent to the input-output manager (21) and to the real time message processing manager (23) to synchronise them with execution of the application program (20).

According to the invention, the operating system (10) of the automation equipment also comprises a module (30) for management of communications with the TCP/IP network (4) and a control task (12) for this module (30).

The communications management module (30) forms the interface between firstly the application program (20) that executes automation monitoring/control functions and secondly the TCP/IP network (4). This software is composed of two sub-modules (31, 32).

A first sub-module (31) presents data that can easily be used by the application program (20) since they are consistent and compatible with the format of objects used by the application program. Therefore, use of these data does not imply any additional processing that could degrade real time performances of the system. Furthermore, the application program (20) and the sub-module (31) share the same memory areas in RAM (3). For example, these data may be the results of processing done by the application program such as history files, set values, diagnostic information, etc.

A second sub-module (32) receives messages from the network (4) that are not intended for the real time message processing manager module (23).

Thus, the driver (40) performs a routing procedure to make a distinction between real time messages to be sent to the manager (23) and other communication messages to be sent to the module (30). According to one embodiment, this routing procedure is based on the use of a given proprietary port that is reserved for the real time message service transported on TCP/IP. According to another embodiment, this routing procedure is based on priority levels contained in IP addressing which are currently being standardised at the IETF (Internet Engineering Task Force), for example in the IPv6 protocol. For example, switching could also be done starting from the application program used; WEB protocols would then be sent to the sub-module (32) for reception of messages from the network (4).

Sub-module (32) presents the data that it receives through a RAM (36), in a format that can be understood by the sub-module (31), which translates them into data that can be used by the application program (20). When a message is sent to the communications management module (30), it is sent through the link (35) to the second sub-module (32). Initially, the message is stored in the memory (36). The second sub-module (32) then extracts information from the message and sends it to the first sub-module (31) for processing. This information may possibly also be memorised in an intermediate buffer memory (33) so that it is not lost if execution of the communications management module (30) is interrupted. The first sub-module (31) then executes commands representative of information extracted from the incoming message. Conversely, to send a message or to send the response to an incoming message, the first sub-module (31) sends the information that it receives as shown by the arrow (34), to the second sub-module (32). The second sub-module (32) then uses the information received from module (31) and stored in its memory (36), to build a message conform with the TCP/IP protocol.

According to the invention, the communications management module (30) is a background application, in other words its execution has a lower priority than the priority of the application program, as far as use of automation equipment resources is concerned.

In order to achieve this, the operating system (10) comprises a control task (12) for the communications management module (30). This control task (12) manages the assignment time for the system unit and the allocation of memory resources specifically reserved for the communications management module (30), through a link (120), such that execution of the application program (20) is not disturbed by execution of the communications management module (30) in the background. According to the invention, the control task (12) sends signals through the link (120) to the communications management module (30), firstly to validate or invalidate its execution, and secondly to assign memory resources and the assignment time of the system unit (1) to execution of the instructions from the communications management module (30).

When operation of the application program (20) is periodic, each beginning of an application program cycle is only triggered after a given time period. This period in the cycle of the application program (20) is usually chosen by the user as a function of the type of automation application to be controlled. In the case of periodic operation, the control task (12) validates execution of the communications management module (30) through a first signal with a determined level supplied on the link (120), firstly between the end of cycle signal (110) and secondly the beginning of cycle signal (111) for the next cycle in the application program (20), generated by the scanning manager (11) and sent to the input-output manager (21) and to the real time message processing manager (23). During execution of an application program cycle (20), the control task (12) invalidates execution of the communications management module (30) through a second signal level sent on the link (120). Invalidation consists of putting execution of communication management on standby, such that the first level of the validation signal is once again received on the link (120) through the communications management module (30), and execution of the communications management module (30) resumes where it stopped. Thus, the task (12) is always synchronised with input/output exchanges of the automation equipment.

When execution of the application program (20) is cyclic instead of periodic, in other words the beginning of one cycle of the application program depends on the end of the previous cycle rather than on the beginning of a given period, the control task (12) validates execution of the communications management module (30) with a signal on the link (120) for a given time period, at the end of an application program cycle. This time period dedicated to the module (30) is initially fixed by default, but the user is advantageously able to set parameters for it to optimise it, while taking steps to ensure that execution of the application program (20) is not disturbed by execution of the communications management module (30). The beginning of the next cycle of the application program (20) is only triggered when the time assigned to the module (30) has elapsed or when the module (30) no longer has any tasks to be done. The parameter settings for this time are determined by the user, for example as a function of the needs of the automation application.

It will be understood that the communications management module (30) and the corresponding control task (12) can be used to assign a communication function for the automation equipment with a TCP/IP network (4) without disturbing the real time execution of the automation application program and without using the back panel bus of the automation equipment. Thus, an information system connected to the TCP/IP (4) of the automation equipment according to the invention can directly access information in the automation equipment without disturbing it, for example through an Internet type browser, to the extent that the communications management module (30) supports the corresponding protocol.

It will be obvious for persons with experience in the subject that this invention enables embodiments in many other specific forms without going outside the application of the invention as claimed. Consequently, these embodiments must be considered as illustrations, that can be modified within the defined scope of the attached claims, and the invention must not be limited to the details given above.

The invention claimed is:

1. An automation equipment comprising:
   a system unit that has at least one memory including a real time operating unit and that has an application program unit included therein that performs monitoring or control functions in an automation application; and
   an internal driver, which is a hardware component, directly included in the system unit and configured to connect to a TCP/IP network without going through a back panel bus,
   the operating unit of the system unit comprising,
      a communications management module configured to communicate to the TCP/IP network, and
      a control task unit responsible for controlling execution of the communications management module, the control task unit being directly connected to the communications management module to avoid disturbing an operation of the application program unit,
      wherein the communications management module is configured to extract information from data to-be-sent to the application program from the internal driver and to utilize said information, when a message is to be sent from the application program to the internal driver, to build said message having a TCP/IP protocol.

2. The automation equipment according to claim 1, wherein, when the application program unit is executed in a periodic mode, the control task unit comprises validation means for authorizing operation of the communications management module between the end of an application program cycle and the beginning of the next cycle.

3. The automation equipment according to claim 1, wherein, when the application program unit is executed in a cyclic mode, the control task unit comprises validation means for authorizing operation of the communications management module at the end of an application program cycle, for a time that a user can configure.

4. The automation equipment according to claim 1, wherein the communications management module comprises a first sub-module that uses a memory area to memorise data transmitted or to be sent to the application program.

5. The automation equipment according to claim 4, wherein the communications management module also comprises a second sub-module that uses a memory area to memorise transmitted data or data to be sent to the TCP/IP network.

6. The automation equipment according to claim 5, wherein the first sub-module of the communications management module transmits data from the automation application program unit to the second sub-module of the communications management module to build up a message transmitted on the TCP/IP network.

7. The automation equipment according to claim 6, wherein the second sub-module of the communications management module transmits information representative of messages from the TCP/IP network to the first sub-module of the communications management module so that it can be used by the application program unit.

8. The automation equipment according to any of the previous claims, wherein the TCP/IP network driver executes a routing procedure for messages received from the TCP/IP network that is based on priority levels contained in the IP address.

9. The automation equipment according to claim 1, wherein the internal driver is connected via a first bus to the communications management module.

10. The automation equipment according to claim 9, wherein the internal driver is connected via a second bus to the control task unit.

11. The automation equipment according to claim 1, wherein the control task unit is connected via a bus to the communications management module such that a command from the control task unit arrives at the communications management module without passing any unit.

12. The automation equipment according to claim 1, wherein the communications management module comprises:
   a first sub-module which presents application program format data to the application program in a format compatible with the application program; and
   a second sub-module which communicates between the first sub-module and the internal driver and which receives data to-be-sent to the application program from the internal driver and processes the received data to-be-sent to the application program into a format compatible with the first sub-module.

13. The automation equipment according to claim 12, wherein the second sub-module extracts information from the received data and stores said information in memory in the second sub-module.

14. The automation equipment according to claim 13, wherein the stored information is available for recovery in an event of a failure of the communications management module.

15. The automation equipment according to claim 13, wherein the stored information is utilized when data to-be-sent from the application program is received from the first sub-module to build a message for transmission from the second sub-module to the internal driver.

16. The automation equipment according to claim 15, wherein the second sub-module utilizes the stored information to build said message having a TCP/IP protocol.

* * * * *